Aug. 11, 1970 R. C. MEHL 3,523,891

ELECTROLYTIC SEWAGE TREATMENT SYSTEM AND PROCESS

Filed Feb. 19, 1969 2 Sheets-Sheet 1

INVENTOR.
RONALD C. MEHL

BY
FOWLER, KNOBBE
& MARTENS
ATTORNEYS.

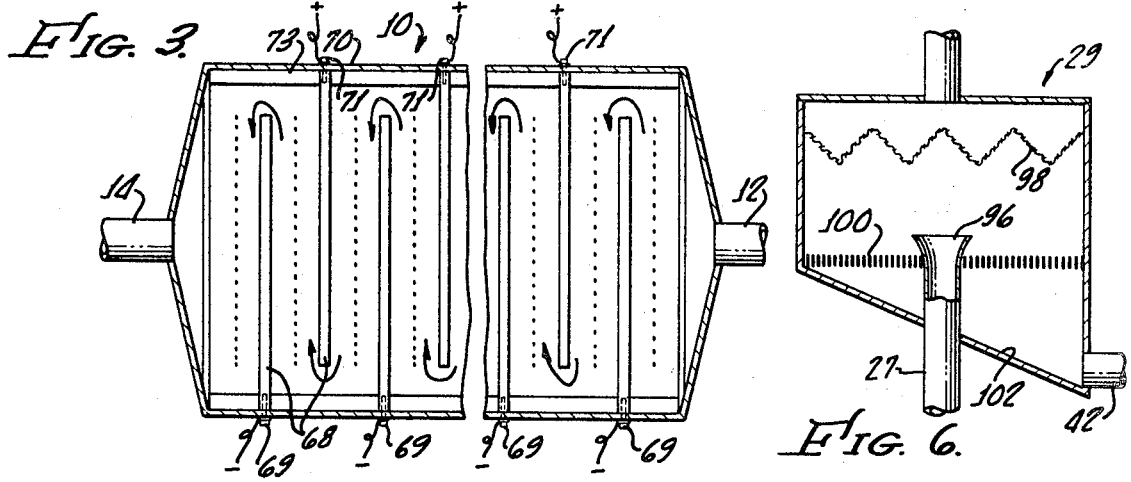
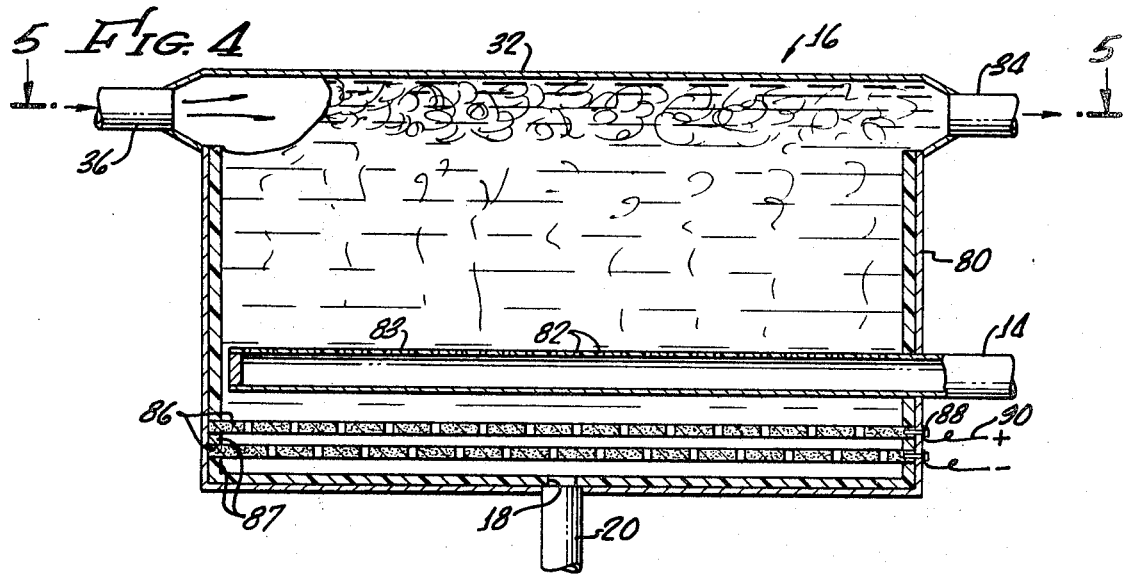
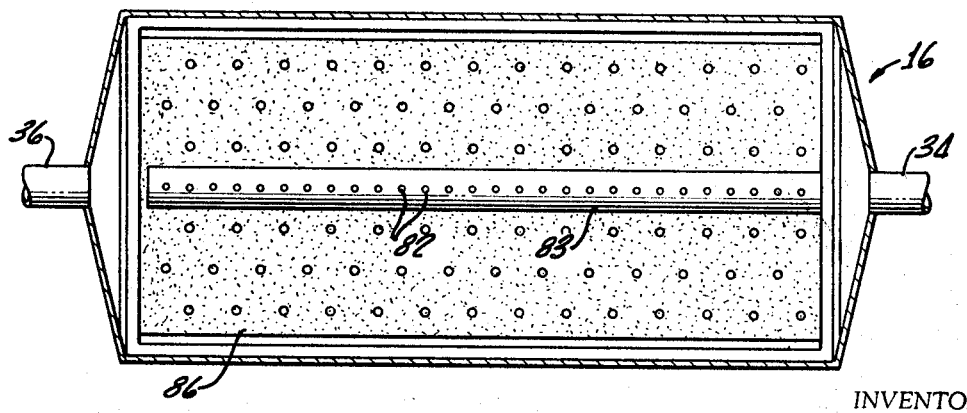

United States Patent Office 3,523,891
Patented Aug. 11, 1970

3,523,891
ELECTROLYTIC SEWAGE TREATMENT
SYSTEM AND PROCESS
Ronald C. Mehl, Colton, Calif., assignor to
Purity Control, Inc.
Filed Feb. 19, 1969, Ser. No. 800,478
Int. Cl. B03d 1/02; C02c 5/12
U.S. Cl. 210—44                                    21 Claims

ABSTRACT OF THE DISCLOSURE

A two stage sewage treatment process and system including a first electrolytic cell for producing a metal hydroxide floc on electrolysis, an ozone unit for bubbling ozone upwardly through the cell and floating the floc on top of the fluid. A vacuum blower communicates with the cell for removing the floc and entrapped solids. A second stage cell having a pair of horizontally mounted electrodes may be included for further removing suspended solids.

---

This invention relates to an apparatus system and process for treating fluids and in particular to the purification of industrial waste and domestic sewage.

Typically, sewage treatment plants use either the activated sludge process or the trickling filter process to purify waste water and sewage. The activated sludge treatment uses a controlled application of bacteria and other microorganisms which feed upon the organic sewage materials to decompose them in a sludge. The activated sludge bacteria feeds on both the suspended and dissolved organic solids. These microorganisms are aerobic and thus an aeration treatment is required to supply them with oxygen. This process necessarily takes a relatively long time for the bacteria to act upon the solids.

The activated sludge plants typically consist of a primary treatment plant which comminutes the incoming sewage, a primary settling tank, an aeration tank, a secondary settling tank and a chlorination station. The microorganisms are kept suspended in the aeration tank.

In the trickling filter system the microorganisms and sewage solids are held on stones of the filter which replaces the aeration tank.

Each of these processes requires large tanks for aeration, settling and clarification of the treated fluids. Each process also requires that the fluids be quiescent so that the microorganisms can act upon the suspended organic solids. Furthermore, it requires several weeks to develop an effective sludge, depending upon the temperature and type of sewage being treated. These systems without additional treatment do not kill the harmful bacteria such as coliform bacteria which contribute to ground and water contamination.

Thus, there is needed a water purification system which does not depend upon the appetites and life cycles of microorganisms, which can be started up quickly and operated with shorter detention times and which can be adjusted to handle various quantities of the waste waters and sewage in a rapid and efficient manner at a relatively low cost of operation.

The system and process of this invention are capable of fulfilling these needs and of producing contaminant-free, sterile liquid and solid effluent. Briefly this system comprises a first stage treatment cell which includes spaced metal electrode plates connected to a power supply for producing multi-valent metallic ions and hydroxyl ions during treatment of the waste waters. The metallic and hydroxyl ions form a floc which floats to the surface of the cell and entraps suspended solids forming a supernatant frothy sludge. Ozone is bubbled through the bottom of the cell to kill the harmful bacteria and help to float the floc and entrapped solids to the liquid surface. The supernatant solids and floc are blown from the liquid surface through a closed vacuum system to a filter-drier where the sterile solids are collected. The liquid is transferred to a second stage cell where further electrolysis and flocculation takes place for removal of any remaining suspended solids. Fine bubbles produced by electrolysis in the second stage cell have been found sufficient to float the floc formed therein to the surface of the liquid. This supernatant floc is then removed from the surface of the second stage by the vacuum blower and blown into the drier. The liquid from the second stage is continuously removed during the process.

The process for treating waste waters and sewage thus comprises passing the fluid influent into a first stage treating zone, forming a floc in the zone, passing the floc upwardly through the fluid being treated to occlude solids in the floc, bubbling ozone through these fluids to assist in flotation of the floc and to kill bacteria in the fluid materials, conveying the supernatant to a drier and conveying the liquid effluent to a second stage treating zone. In the second stage the process includes forming a floc in the treating zone, floating the floc to the surface to entrap any remaining solids, conveying the supernatant to a drier and recovering a purified liquid effluent which is low in total dissolved and suspended solids.

One feature of the system of this invention is that it operates automatically independent of microorganism decomposition of solid waste materials to provide a liquid effluent having acceptable total solids and biological oxygen demand levels and a sterile solid effluent.

Another feature of the system of this invention is that it enables faster purification of waste waters and sewage than is possible with present sewage treatment systems, effective purification being achieved in detention times of from 10 to 30 minutes.

Another feature of the system and process of this invention is that large fluctuations in influent flow do not effect the efficiency of the purification process or the quality of the treated water.

Still another feature of the system and process of this invention is that an effective cost saving is provided for purification of industrial waste waters and sewage through lower initial capitalization costs, smaller real estate requirements and amenability of the process to automation.

These and other features of the apparatus, system and process of this invention will be more readily apparent from the following description when taken into consideration with the appended claims and attached drawings wherein:

FIG. 3 is a horizontal sectional view through the first stage electroflotation and oxidation cell taken substantially along lines 3—3 of FIG. 2;

FIG. 4 is a longitudinal vertical sectional view through the second stage electroflotation cell of the system of this invention;

FIG. 5 is a horizontal sectional view through the second stage cell of FIG. 4 taken substantially along lines 5—5; and FIG. 6 is a vertical sectional view through the drier-filter of the system.

Figure 1:
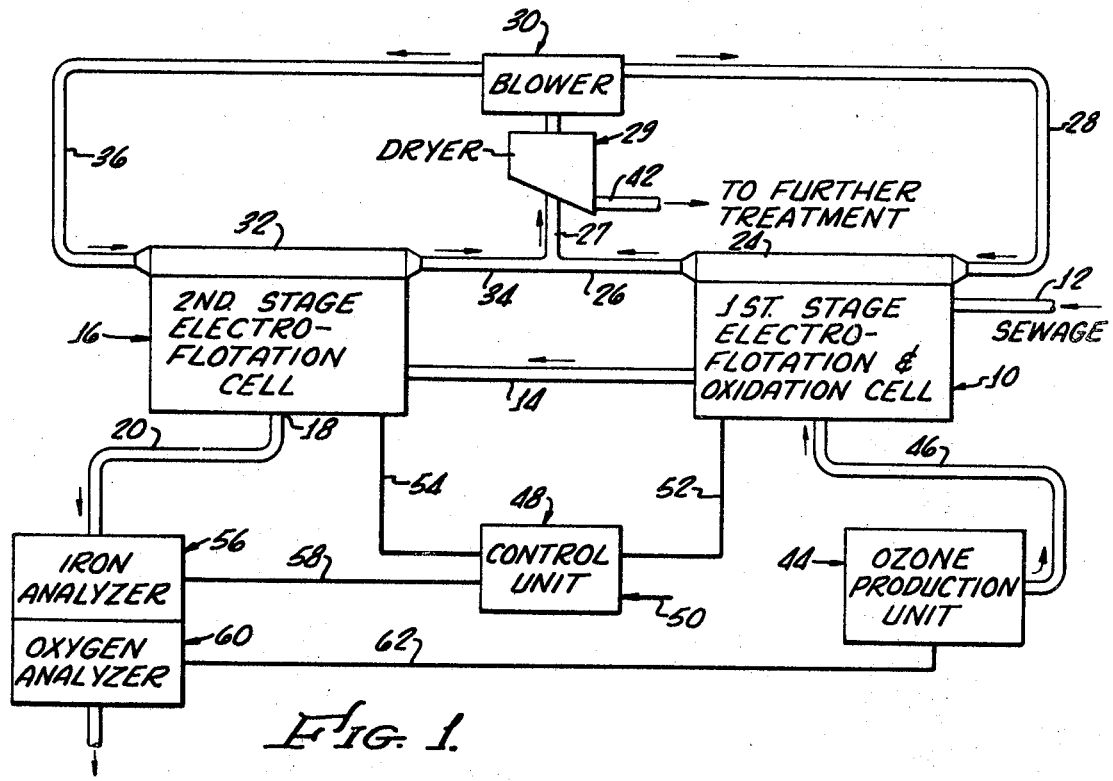
FIG. 1 is a flow diagram of the apparatus system and process of this invention.

The basic flow diagram for the system of this invention, as shown in FIG. 1, comprises a first stage electroflotation and oxidation cell 10 which receives the sewage or industrial waste water through an influent pipe conduit 12 from a primary clarifier or settling tank (not shown). The process steps of removing solids by entrapment in a flocculated metal hydroxide and of sterilization by ozone contact are performed in the first stage cell. The liquid effluent from the first stage cell 10 flows through a connecting conduit 14 into the second stage electroflotation cell 16 where remaining solids are removed in a second floc flotation step. The liquid effluent from the second stage treating cell 16 drains out the bottom of the cell through an outlet 18 into a discharge conduit 20 which communicates with a purified water outlet. The liquid flow path through the system is thus defined by the conduits 12, 14 and 20 and the cells 10 and 16.

The uppermost portion of the first stage cell 10 is capped by a manifold or header 24 which communicates by means of air conduits 26, 27 and 28 with a filter-drier 29 and a vacuum blower fan 30. A similar header 32 is mounted on the second stage electroflotation cell 16. The header 32 communicates with the drier 29 and the blower 30 through conduits 27, 34 and 36. Thus, air flows through a closed system formed by the blower 30, the drier 29, conduits 26, 27, 28, 34 and 36 and the headers 24 and 32.

Frothed solids are floated on top of the liquids being purified in both the first stage cell 10 and the second stage cell 16 to form supernatant sludges. These sludges are then blown into the filter-drier 29 where they are dried to fine powdery, sterile solids. The dried solids pass into a conduit 42 which leads to a waste dump or to a further treating station where the solids are conditioned for use as fertilizer or otherwise further treated.

The first stage electroflotation and oxidation cell 10 communicates with a controllable ozone production unit 44 through a conduit 46 which bubbles ozone upwardly through the liquids contained in the first stage cell 10.

A control unit 48 is electrically connected to an AC power source through line 50 and to both the first stage and second stage cell by lines 52 and 54 for regulating electrolysis in these cells. An iron ion analyzer 56 connected on the downstream side of the second stage electroflotation cell 16 monitors the iron content in the liquid effluent. The output of analyzer 56 is an electrical signal on line 58 which varies in accordance with the iron content of the liquid effluent. This signal provides a feedback control input signal to control unit 48 for automatically regulating the electrical power supplied over lines 52 and 54 to the first and second stage treating cells. This may be accomplished by automatically varying the potential across the electrode plates of the treating cells. Alternatively, the power supplied to the first and second stage treating cells may be manually regulated at control unit 48 as by manually varying the potential across the electrode plates of the cells.

Similarly, an oxygen analyzer 60 connected on the downstream side of the second stage flotation cell 16 in conduit 20 monitors the oxygen content of the liquid effluent and provides a feedback control signal, such as an analog voltage, through line 62 for automatically regulating the ozone production unit. For example, as the oxygen content decreases, a signal is sent to the ozone production unit for increasing the amount of ozone bubbled through the first stage electroflotation and oxidation cell. Alternatively, the ozone unit 44 may be manually regulated to adjust the monitored oxygen content.

By maintaining the oxygen and iron contents of the effluent at substantially constant levels, uniform purification can be obtained. Analyzers 56 and 60 capable of producing electrical signals, such as for example an analog voltage output, corresponding to the concentration of iron ions and oxygen present are well known and are therefore not described in detail herein.

As seen in FIG. 1, the entire system is closed to the atmosphere by use of the closed vacuum blower system and dried connection. The rapid movement of gases through the vacuum blower system reduces the odor given off so that the entire system is relatively non-offensive at even close range. Although all of the air and liquid conduits are shown as cylindrical pipes any type ducting can be used for conveying the materials through the system. Plastic pipes are preferred for the liquid conduit. A more detailed discussion of the basic portions of the system is presented in the following subtitled sections.

FIRST STAGE CELL

Figure 2:
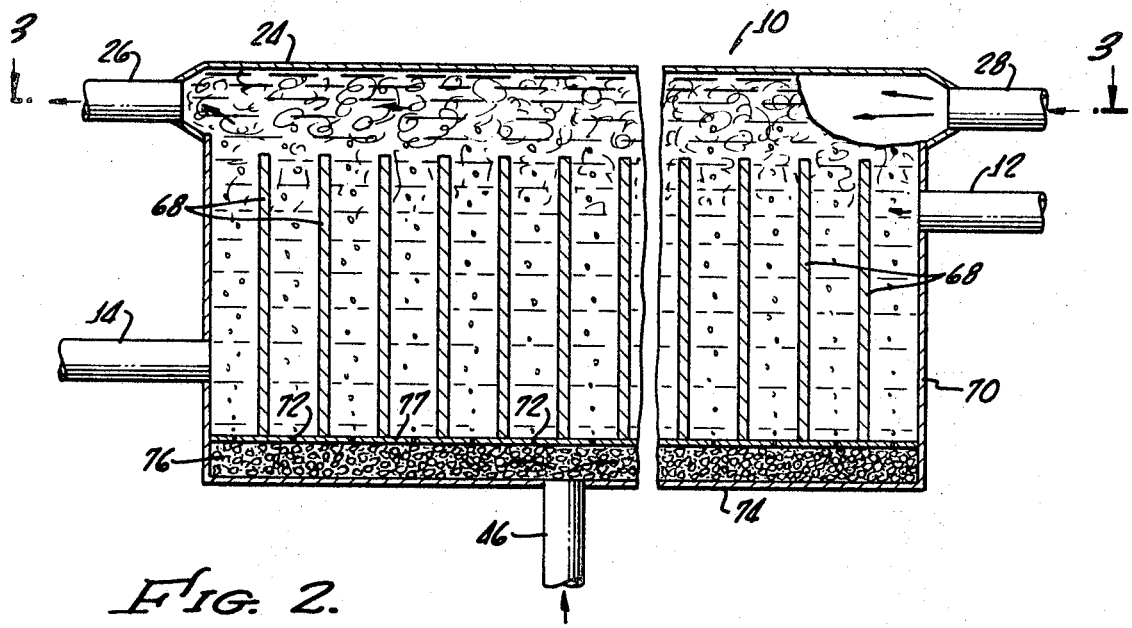
FIG. 2 is a vertical sectional view through the first stage electroflotation and oxidation cell of the system of this invention.

Purification of the influent to the system is accomplished in the first stage cell 10, as best shown in FIGS. 2 and 3, by electrolysis with a series of longitudinally spaced generally rectangular metallic electrode plates 68. The plates 68 are preferably constructed from a metal which is capable of producing a tri-valent ion which will flocculate upon electrolysis as a metal hydroxide floc. The preferred metal for the plates is iron although other multi-valent metals such as aluminum can be used. The exact alloying content of the iron is not critical as long as it is capable of acting as a ferric ion producing electrode.

Other electrode materials include platinum coated titanium and stainless steel. The stainless steel electrodes have a service life of approximately one year whereas the platinum coated titanium has a service life of about ten years. Electrodes formed from scrap iron, such as pressed iron punchings, have much shorter life span but can be entirely dissolved so that only the addition of new electrodes is periodically required.

FIG. 3 shows that each of the electrode plates 68 is mounted within a substantially rectangular cell compartment 70 having an insulation layer 73 which separates each of the plates. The plates extend inwardly from both sides of the compartment 70 in alternate fashion as shown in FIG. 3. The plates are alternately connected to opposite poles of a rectified AC power supply in the control unit 48 as by means of terminals 69 and 71 through line 52 of FIG. 1. When a voltage is applied across the end plates through terminals 69 and 71 electrolysis occurs within the cell for producing metal and hydroxyl ions which flocculate.

The rectangular cell compartment 70 is electrically non-conductive and may be constructed from plastics, concrete, ceramics or other such materials. Bus bars (not shown) may be used to interconnect all of the like-sign plates and reduce the number of terminals.

The ozone gas is bubbled into the cell 10 through the orifices 72 of a diffuser 74 which is filled with a bed of porous stone 76. The diffuser 74 is formed by the bottom wall and portions of the side walls of the compartment 70. A cover 77 is fixedly attached to the side walls of the compartment 70 for defining the diffuser chamber. The series of small diameter diffuser orifices 72 are formed in the cover 77 for distributing the ozone through the cell 10 between adjacent electrode plates 68. The stones 76 may be porous slag, porous lava or air stone. It is preferred that the stone 76 be sufficiently fine so that the bubbles which pass upwardly between the plates 68 through the liquid being purified have a diameter of approximately 1 mm.

As the ozone enters the diffuser 74 from the ozone conduit 46, it is diffused outwardly by the porous stone 76 toward both ends of the diffuser 74 so that an even distribution of these fine bubbles throughout the cell is achieved. Additional ozone conduits 46 for delivering the ozone into the cell 10 may be provided for enhancing the ozone distribution. The ozone pressure is varied by ozone production unit 44 to maintain the ozone level within cell 10 sufficiently high to be lethal to the bacteria in the material being treated and to float the metal hydroxide floc formed by electrolysis into the supernatant sludge.

During operation of the first stage electroflotation and oxidation cell 10 bubbles of oxygen and hydrogen are formed at the iron cathodes and ferric ions go into solution at the iron anodes forming the floc. The ozone bubbles entering the cell through the porous stone 74 attach themselves by surface tension to the floc and float to the top of the cell. As the floc is carried upwardly through the cell 10 it occludes suspended solids so that the suspended solids are rapidly reduced by occlusion in the coagulated floc. The ozone bubbles also increase oxidation of the dissolved solids to form precipitates which are removable with the floc. Once the floc reaches the top of the cell 10 it is blown through the header 24 and conduit 26 by means of the vacuum blower 30.

As can be seen in FIG. 3 the fluids move through the cell 10 in a sinusoidal path around and between the electrodes 68. The electrode plates can be spaced from .4 to 1.5 inches and their thickness is preferably from .4 to 2 inches. In the preferred embodiment the cell contains 81 iron plates of about one half inch thickness which are spaced one half inch apart and housed in a non-conductive cell chamber approximately 3' x 3' x 8'.

The potential across the cell electrodes may be varied from 8 to 150 volts and the current from about 3 to 300 amps. Optimum results have been obtained at about 100 volts differential across the electrode plates. The resistance of the waste waters and sewage may vary between .5 to 3 ohms.

The movement of the fluids being treated through the cell is sufficiently slow so that floating of the solids into the supernatant frothy sludge can occur. The efficiency of the system may be enhanced by occasionally reversing the potential on the plates 68 to clean the electrode plates of deposited solids and adhering gases.

SECOND STAGE CELL

The second stage electroflotation cell 16 which receives the liquid effluent from the first stage cell 10 through conduit 14 is shown in FIGS. 4 and 5. This cell 16 also is a capped non-conductive rectangular compartment 80 below the manifold or header 32 which communicates with the blower conduits 34 and 36. The influent to the second stage electroflotation cell 16 enters through a series of axially spaced, vertically extending orifices 82 in the top of the end section 83 of the conduit 14 which extends into the second stage cell 16. The liquid is directed upwardly toward the top of the cell by these orifices. Any suitable number of orifices 82 may be used depending upon the quantity of fluid being treated.

A pair of horizontally-extending, vertically spaced metallic electrodes 86 extend across the lower portion of the cell 16. The electrodes 86 are supported at their opposite ends by the insulation 87 of the cell which also separates the electrodes. Both electrodes 86 are preferably perforated to provide greater surface area and to permit gas bubbles to easily pass therethrough. These may be holes drilled through the electrodes, as shown, or metallic grids or screen-like plates can be used for the electrodes. Preferably the electrodes 86 are constructed from a porous metal such as a pressed sponge metal or a sintered powder metal. Again the preferred electrode material is iron which produces a ferric hydroxide floc upon electrolysis. Any of the electrode materials for the first stage cell 10 which can be formed into a porous plate are suitable in the second stage cell. The porosity should preferably be about 60 to 75%.

Each of the plates 86 is provided with an electrical terminal 88 which is connected to one pole of a rectified AC power source in the control unit 48 by means of a lead 90 and the line 54 to the control unit. The plates are thus connected to opposite poles so that electrolysis also occurs in the second stage cell 16. Oxygen and hydrogen gases are formed at the cathode plate forming bubbles which pass upwardly through the liquid being purified. At the same time a floc is formed by the ferric ions going into solution at the anode plate. The floc is carried upwardly with the bubbles entrapping any remaining solids as it rises. Either of plates 86 may be the cathode. The efficiency of the cell is maintained high by occasionally reversing polarity of the plates to clear the electrode surfaces of deposited solids.

The floc with the entrapped solids collects as a supernatant frothy sludge in the header 32 and is blown out of the cell through the conduit 34 into the drier 29. The second stage electroflotation cell 16 thus reduces the suspended solid content in the fluids being purified by keeping the floc passing upwardly through the fluids to entrap any suspended solids not collected in the first stage. The purified, clear liquid effluent from the second stage cell 16 leaves the cell below the electrodes 86 through the liquid outlet 18 and the conduit 20.

The second stage electroflotation cell is approximately the same size as the first stage cell and constructed from similar materials. The size of both cells, of course, can be varied to treat varous quantities of the influent being purified. Alternatively, several cells of the standard most efficient size can be included in the first and second stage to increase the capacity of the system.

The voltage across the electrodes 86 is relatively low on the order of 8 to 100 volts which preferably is supplied by a rectified AC power source. The amperage may vary up to about 300 amps depending upon the resistance of the liquid. The electrodes 86 may be from about .4 to 2 inches thick and may be maintained vertically spaced apart from about .4 to 1.5 inch.

The liquid flowing through the outlet 18 is very low in both suspended and dissolved solids. The dissolved solids are precipitated by oxygen produced in the second stage and the ozone from the first stage. The precipitates and other suspended solids are entrapped in the floc and are removed by the oxygen and hydrogen bubbles which rise to the surface of the cell.

The oxygen and hydrogen bubbles produced at the electrodes of both stage cells are extremely effective for flotation of the flocs since these bubbles are generally 0.1 mm. or less in diameter and have a low tendency to coalesce after separating from the electrode. The flow around the bubbles as they rise through the liquid is laminar so that little turbulence or mixing is caused in the cell.

A small dose of an electrolyte material such as the sulfide forming salts, for example ferric sulfate, may be added to either the first or second stage cell to form micro-flocs which carry small positive charges. These micro-flocs, virtually impossible to settle, may be removed by absorption in depth or on the core sand surfaces of a filter bed. It has been found that it is usually not necessary to add such materials but for high resistivity influent the cell efficiency can be increased by the addition of up to about 15 mg. per liter of the salt depending upon the condition of the water being treated.

DRIER FILTER

As best shown in FIG. 6, the drier-filter 29 for the solids includes a vertically extending inlet conduit 96 which communicates with the internal chamber of drier 29. A series of cloth filters 98 are mounted at the upper portion of the drier chamber for preventing the solids from being blown into the blower 30. The wet solids cling to the cloth filter 98 and when dried fall downwardly through a grating 100 into an inclined waste chute 102 which is connected to the conduit 42.

Any conventional system for filtering the solids from the flowing air and removing them from the system may be employed. The dried foam formed by the floc and entrapped solids is a powder-like, fine mesh solid material. This powdered dry solid material has been found, due to its iron content, to provide an excellent fertilizer which can be modified or balanced by the addition of other elements or used as produced as a dry fertilizer. The organic content of the dried waste of course depends upon the type influent being treated. The solid waste has been found to be sterile since the ozone and oxygen kill all of the bacteria.

OZONE PRODUCTION UNIT

Ozone is produced in the ozone production unit 44 in conventional manner as by passing dry air between electrodes with a high voltage potential. The air circulating through the blower system lines 36, 38 may be partially recirculated into the ozone production unit since a portion of the circulated air will be high in ozone from the first stage 10. Suitable responsive circuitry is included in the ozone production unit for interpreting the signal from the oxygen analyzer 60 and increasing or decreasing the ozone production.

The quantity of ozone used for this invention generally should vary between 1.5 and 3.5 mg. per liter depending upon the content of the waste water being treated.

CONTROL UNIT

The control unit includes suitable circuitry responsive to the control signal from the iron analyzer for regulating the power delivered to the cells. The unit includes the necessary circuitry for manually varying the limits on the power automatically supplied to the cells to correlate the power limits to the type material being treated.

With the system and process of this invention it has been found that the total suspended and dissolved solid content of the liquid being purified can be reduced to levels comparable with activated sludge and trickling filter plants in less than one half of the detention time. Additionally the system of this invention requires less than half the total space required by other sewage treatment plants of the same capacity. The biological oxygen demand and alkyl benzyl sulfate of the effluent from the process of this invention are sufficiently low so that the water is suitable for industrial water supply, for irrigation, or for percolation into the water basin.

It has been found that a detention time of 10 to 30 minutes in the system is sufficient to sterilize the solids and produce a clear acceptable water effluent. This has been effectively achieved using flow rates which vary from 3 to 10 gallons per minute.

An additional advantage of the system and process of this invention is that it can be entirely automated with the power requirements regulated by automatic analyzers such as the iron analyzer 56 and the oxygen analyzer 60 to operate the cells at the most efficient level for the particular material being treated.

What is claimed and desired to be secured by Letters Patent is:

What is claimed is:

1. A process for purifying liquids including the steps of:
    passing an influent liquid containing suspended and precipitated solids in a treating zone;
    forming a flocculated metal hydroxide in said treating zone;
    passing said flocculated metal hydroxide upwardly through said treating zone to remove said suspended and precipitated solids from said liquid;
    removing said flocculated metal hydroxide from the upper portion of said treating zone;
    removing a liquid effluent from said treating zone;
    monitoring the metal ion concentration in said liquid effluent; and
    regulating the formation of flocculated metal hydroxide in said treating zone to maintain said monitored metal ion concentration in said liquid effluent substantially constant.

2. A process for purifying liquids including the steps of:
    passing an influent liquid containing dissolved and suspended solids therein into a treating zone;
    contacting said influent in said treating zone with an ozone gas to precipitate said dissolved solids;
    forming a flocculated metal hydroxide in said treating zone;
    passing said flocculated metal hydroxide upwardly through said treating zone to remove said suspended and precipitated solids from said liquid;
    removing said flocculated metal hydroxide and entrapped solids from the upper portion of said treating zone; and
    removing the liquid effluent from a point in said treating zone below the point of removal of said flocculated metal hydroxides and entrapped solids.

3. A process as defined in claim 2 wherein said flocculated metal hydroxide is ferric hydroxide, said treating zone includes a plurality of spaced iron electrodes and said flocculated ferric hydroxide is formed by electrolytically applying a voltage potential across said electrodes to produce ferric ions.

4. A process as defined in claim 2 wherein said flocculated metal hydroxide and said entrapped solids are removed by means of a closed system vacuum blower which blows the solid material off the top of the liquid in said treating zone.

5. A two stage process for purifying waste waters and sewage comprising the steps of:
    passing an influent liquid containing suspended and dissolved solids into a first stage treating zone;
    contacting said influent in said treating zone with an ozone gas to oxidize and precipitate dissolved solids;
    electrolytically forming a flocculated metal hydroxide in said treating zone;
    passing said flocculated metal hydroxide upwardly through said treating zone and removing said suspended and precipitated solids therefrom as a supernatant frothy sludge;
    removing said supernatant sludge from the upper portion of said treating zone;
    conveying the treated liquid from said treating zone to a second stage treating zone;
    electrolytically forming a flocculated metal hydroxide in said second stage treating zone;
    passing said flocculated metal hydroxide upwardly through said second stage treating zone to remove any remaining solids from said liquid and to form a supernatant frothy sludge at the upper portion of said zone;
    removing said supernatant sludge from the upper surface of said second stage zone; and
    removing a treated liquid effluent from said second stage treating zone.

6. A process as defined in claim 5 further comprising the steps of:
    commingling the solids from said second stage zone with the solids from said first stage zone;
    drying the commingled solids from said first and second stage treating zones; and
    removing said dried solids.

7. A process as defined in claim 5 wherein said flocculated metal hydroxide is ferric hydroxide formed by applying a potential of from 8 to 150 volts across the iron electrodes in said first and second stage treating zones.

8. A process as defined in claim 7 wherein the ferric ion content is monitored for the liquid effluent from said second stage treating zone and the potential across said electrodes is varied to maintain said ferric ion content at a substantially constant level.

9. A process as defined in claim 5 wherein said ozone is bubbled into said first stage treating zone through a bed of porous stone to produce bubbles of ozone having an average diameter of about 1 mm. which help float said flocculated metal hydroxides to the upper portion of said zone.

10. A process as defined in claim 5 wherein the dissolved oxygen content of the liquid effluent from said second stage treating zone is monitored and the flow of ozone to said first stage zone is regulated to maintain said oxygen content substantially constant.

11. A process as defined in claim 5 wherein said second stage treating zone comprises an electroflotation cell having a pair of horizontally extending electrode plates made of a porous iron one of said plates being perforated and said process further includes the step of injecting said liquid effluent from said first stage zone into said second stage zone above said electrode plates in an upwardly flowing direction.

12. A process as defined in claim 6 wherein said solids are removed by means of a vacuum blower which communicates with said zones and with a drier in a closed air conduit system.

13. A process as defined in claim 5 further including the step of adding an electrolyte salt to one of said zones.

14. A system for purifying liquids including:
   means defining a treating cell for receiving liquids;
   a series of spaced metallic electrode plates mounted in said treating cell;
   means connected to said cell for supplying electrical power to said electrode plates for ionizing said metallic plates and forming a metal hydroxide floc in the liquid in said cell;
   means for removing the solid materials from said cell; and
   means for monitoring the metal ion content in the liquid effluent from said cell, said monitoring means being connected to said means for supplying electrical power to the electrode plates of said cell for regulating said power supplied to maintain the metal ion concentration in said liquid effluent substantially constant.

15. An apparatus system for purifying liquids including:
   means defining a first stage treatment cell for receiving liquids;
   a series of spaced metallic electrode plates vertically mounted in said first stage treatment cell;
   means forming a closed cover to define a header chamber over said cell in communication with the liquid in said cell;
   vacuum blower means communicating with said header chamber for blowing solids from the upper surfaces of the liquid of said cell;
   a drier and filter member intermediate said cell and said vacuum blower and in fluid communication with said cell and said vacuum blower;
   means in fluid communication with said cell for bubbling ozone upwardly through said cell intermediate said spaced metallic electrode plates; and
   means connected to said cell for supplying an electrical potential across said electrode plates for ionizing said metallic plates and forming a metal hydroxide floc in the liquid in said cell.

16. An apparatus as defined in claim 15 wherein said vertically mounted electrodes are spaced apart from .4 to 1.5 inches.

17. An apparatus system as defined in claim 15 wherein said first stage treatment cell is in fluid communication with a second stage treatment cell, said second stage treatment cell including:

a pair of vertically spaced horizontally mounted porous metallic electrodes in the lower portion thereof;
means connecting said horizontally mounted electrodes to said electrical potential supplying means;
means forming a closed cover over said second stage treatment cell to define a header chamber over said cell;
vacuum blower means communicating with said header chamber for blowing solids from the upper portion of said cell;
means connecting said header chamber with said drier and filter member; and
means for removing treated liquids from said second stage cell.

18. An apparatus system as defined in claim 17 further including means for monitoring the ferric ion content in the liquid effluent from said second stage cell, said monitoring means being connected to said means for supplying an electrical potential across the electrode plates of said first and second stage tretatment cells for regulating said potential to maintain the ferric ion concentration substantially constant.

19. An apparatus system as defined in claim 17 wherein said horizontally mounted porous electrodes in said second stage treating cell have a porosity of from 60 to 75%, are spaced apart by a distance of from .4 to 1.5 inches, and one of said electrodes has perforations therein.

20. An apparatus as defined in claim 18 wherein the vertically mounted electrodes in said first stage treating cell and the horizontally mounted electrodes in said second stage treating cell are from .4 to 2 inches thick.

21. An apparatus system as defined in claim 15 wherein said means for bubbling ozone through said cell comprises an ozone carrying conduit, a diffuser member mounted in the bottom portion of said cell, said diffuser member including a chamber filled with porous stone; a cover having a plurality of spaced orifices, said cover being oriented so that said orifices are intermediate the electrodes in said cell.

References Cited

UNITED STATES PATENTS

| | | | |
|---|---|---|---|
| 398,101 | 2/1889 | Webster | 204—149 |
| 1,131,067 | 3/1915 | Landreth | 204—149 |
| 3,035,992 | 5/1962 | Hougen | 204—149 |
| 3,276,994 | 10/1966 | Andrews | 210—63 X |
| 3,295,688 | 1/1967 | Lowe | 210—221 X |
| 3,347,786 | 10/1967 | Baer et al. | 210—47 X |
| 3,255,881 | 6/1966 | Holderreed et al. | 209—1 |
| 3,340,175 | 9/1967 | Mehl | 204—268 |

FOREIGN PATENTS

| | | |
|---|---|---|
| 599,456 | 6/1960 | Canada. |

MICHAEL E. ROGERS, Primary Examiner

U.S. Cl. X.R.

210—47, 50, 96, 202, 221; 204—149, 269